(12) United States Patent
Bolden

(10) Patent No.: US 8,860,792 B1
(45) Date of Patent: Oct. 14, 2014

(54) TWO DIMENSIONAL TO THREE DIMENSIONAL VIDEO DISPLAY SYSTEM

(76) Inventor: Tommy Lee Bolden, Fort Lauderdale, FL (US)

( * ) Notice: Subject to any disclaimer, the term of this patent is extended or adjusted under 35 U.S.C. 154(b) by 261 days.

(21) Appl. No.: 13/287,240

(22) Filed: Nov. 2, 2011

Related U.S. Application Data

(60) Provisional application No. 61/409,141, filed on Nov. 2, 2010.

(51) Int. Cl.
*H04N 7/18* (2006.01)

(52) U.S. Cl.
USPC .......................................................... 348/58

(58) Field of Classification Search
CPC ................................................ H04N 13/0434
USPC ........................................ 348/58, 744; 345/7
See application file for complete search history.

(56) References Cited

U.S. PATENT DOCUMENTS

| | | | |
|---|---|---|---|
| 4,000,367 A | 12/1976 | Field | |
| 4,414,565 A | 11/1983 | Shanks | |
| 4,475,126 A | 10/1984 | Akins | |
| 5,061,052 A | 10/1991 | DeJesus | |
| 5,132,839 A | 7/1992 | Travis | |
| 5,291,297 A | 3/1994 | Steinmeyer | |
| 5,537,144 A | 7/1996 | Faris | |
| 5,570,138 A * | 10/1996 | Baron | 348/744 |
| 5,671,007 A | 9/1997 | Songer | |
| 5,691,843 A | 11/1997 | O'Neill | |
| 5,790,086 A | 8/1998 | Zelitt | |
| 5,822,117 A | 10/1998 | Kleinberger et al. | |
| 6,144,417 A | 11/2000 | Yanagisawa | |
| 6,219,183 B1 | 4/2001 | Doany | |
| 6,449,090 B1 | 9/2002 | Omar et al. | |
| 6,831,678 B1 | 12/2004 | Travis | |
| 7,349,570 B2 | 3/2008 | Chen | |
| 7,889,153 B2 * | 2/2011 | Kitaguchi et al. | 345/7 |
| 2007/0198107 A1 | 8/2007 | Delgado | |

* cited by examiner

*Primary Examiner* — Dave Czekaj
*Assistant Examiner* — Berteau Joisil
(74) *Attorney, Agent, or Firm* — Lhota & Associates, P.A.

(57) ABSTRACT

A video image conversion display system that displays a 2-D video projection from a television or computer screen as a 3-D video image, the video display system having an autostereoscopic interference filter polarization film that creates 3-D viewing by creating the illusion of depth perception from a 2-D video image and having a housing compartment that stores and secures a 3-D polarization screen, a spring-loaded 3-D video screen support rod inside the housing that is rotatable for extending the 3-D screen into a lockable position in front of a television or video monitor and that automatically retracts the 3-D video screen back into the housing when unlocked and released and a magnification screen system that enlarges the projected 3-D video image. Alternatively, the 3-D video screen support rod may be rotated by an electric motor.

15 Claims, 5 Drawing Sheets

TWO DIMENSIONAL TO THREE DIMENSIONAL VIDEO DISPLAY SYSTEM

CROSS REFERENCE TO RELATED APPLICATIONS

This application claims the benefit of provisional patent application Ser. No. 61/409,141 filed Nov. 2, 2010.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

This invention relates generally to a two (2-D) to three dimensional (3-D) video conversion and image enhancement system, and more particularly, to a system that converts a television, computer or other two-dimensional (2-D) screen system into a 3-D image and that removably attaches to an existing television, computer screen or other video monitor to convert a 2-D video projection to a 3-D video image.

2. Description of the Background Art

Three dimensional (3-D) movies, games and videos have become increasingly popular in recent years. This is in part due to 3-D attractions at amusement parks and the evolution of 3-D televisions. Typically, 3-D glasses are required to watch a 3-D VIDEO image. The 3-D technology has advanced to the point where television manufacturing companies are now boasting televisions with 3-D imaging. However, the availability of 3-D televisions for the average person is limited by costs. In addition, most people already own televisions. Moreover, 3-D glasses are known to be bulky and uncomfortable. Accordingly, even though people would like to be able to enjoy 3-D viewing they do not want to spend the money it takes to purchase a new 3-D television or want to wear 3-D glasses. Another feature television viewers and computer users would like to have is the ability to magnify the projected image. If there was a 3-D accessory that converted a two-dimensional (2-D) projection into 3-D it would allow people to watch 3-D on their current televisions or computers without 3-D glasses and would be well received. If there existed an accessory that magnified a television or computer projection it would allow people to enhance the projected image for easier and more enjoyable viewing. In fact, it would be desirable to have an accessory that provided 3-D viewing without 3-D glasses as well as magnification of the screen image.

There are a variety of devices for producing three dimensional visual displays, however, none of these devices address or effectively resolve the foregoing needs in the background art. For instance, U.S. Pat. No. 4,000,367, issued to Field, discloses an apparatus for producing depth effect in two, dimensional pictures. The apparatus consists of a hood or mask, tube and framing aperture smaller than the picture. U.S. Pat. No. 4,414,565, issued to Shanks, discloses a method and apparatus for producing three dimensional displays by causing a two dimensional image to appear on a saddle shaped surface, such as a light scattering glass or a surface in space formed by an optical component such as an aspheric lens or lenticular array. U.S. Pat. No. 5,061,052, issued to DeJesus, discloses a television picture enhancement device for magnifying the image on a television receiver to viewers in a room. The system consists of a plano-convex lens disposed in front of the viewing screen of a television set and a Fresnel lens interposed between the viewing screen and the plano-convex lens. U.S. Pat. No. 5,132,839, issued to Travis, discloses a three dimensional display device consisting of a backlighting apparatus for projecting beams of light in selected directions, a spatial light modulator for displaying images back-lit by the back lighting apparatus and a control system coupled to both the spatial light modulator and the backlighting apparatus. U.S. Pat. No. 5,291,297, issued to Steinmeyer, discloses an illusion creating apparatus comprising a housing, and a CRT in which a setting is superimposed around a real image rather than a reflected image being superimposed into the middle of the setting using a beam splitter. U.S. Pat. No. 5,537,144, issued to Faris, discloses an electro-optical display system for visually displaying polarized spatially multiplexed images of 3-D objects for use in stereoscopically viewing the same with high image quality and resolution. U.S. Pat. No. 5,671,007, issued to Songer, discloses a two-dimensional and three-dimensional imaging device with improved light valve and field rate for broadcasting in accordance with worldwide electronic viewing formats. U.S. Pat. No. 5,691,843, issued to O'Neill, discloses an enhanced depth perception in a two-dimensional image wherein light filtering materials, preferably vertical strips of polarizing material, are disposed proximate to a suitably framed two-dimensional image to induce a sense of depth perception. U.S. Pat. No. 5,790,086, issued to Zelitt, discloses a 3-D imaging system wherein a 3-dimensional image is obtained from a 2-dimensional display by varying the apparent distance of the image from the viewer on a pixel by pixel basis. U.S. Pat. No. 5,822,117, issued to Kleinberger et al., discloses systems for three-dimensional viewing including first and second light polarizing layers aimed at full-color-flat-screen binocular viewing without the use of eyeglasses wherein light emanating from a display presenting a left image and a right image is directed only to the appropriate left or right eyes of at least one viewer using various combinations of light polarizing layers and layers of light rotating means. U.S. Pat. No. 6,144,417, issued to Yanagisawa, discloses a screen window frame which is capable of producing clear 3-D video images with a frame structure that covers over a screen of a display unit at a prescribed distance from away from the screen wherein the frame structure encloses a window space, whose size is smaller than the size of the screen of the display unit so as to cover parts of the display unit other than the screen, U.S. Pat. No. 6,219,183, issued to Doany, discloses a compact rear projection display having a projection device, a screen and a screen moving device. The projection device projects an image, the screen is provided for displaying the image and the screen moving device is used to move the screen in relation to the projection device. U.S. Pat. No. 6,449,090, issued to Omar et al., discloses a three dimensional display viewable in both stereoscopic and autostereoscopic modes. U.S. Pat. No. 6,831,678, issued to Travis, discloses an autostereoscopic display for displaying a large image to an observer, comprising a screen for displaying patterns, the screen being formed of a plurality of separate areas each capable of receiving a segment of a pattern with the segments forming a complete frame of a pattern. U.S. Pat. No. 7,349,570, issued to Chen, discloses a graphic image to 3D image conversion device which includes an image input loop, image control loop, output parity horizontal translation image IR circuit and IR spectacles. Lastly, U.S. Pat. Application Publication No. 2007/01981087, filed by Delgado, discloses a 3D image projection system consisting of an optical subsystem that generates the image in space, software and electronic components that generate images in 2D. The aforementioned patents and application publication fail to adequately address or provide a video image display system that displays a two dimensional video image as a three dimensional without the use of complicated electronics, software, mirrors and the like. Accordingly, there exists a need for such a system.

Pursuant to the foregoing, there are no known devices that provide 3-D viewing of 2-D screens and projections or that magnify the image displayed on a television or computer screen without the use of electronic circuits, mirrors and other complicated systems. It is, therefore, to the effective resolution of the aforementioned problems and shortcomings of the prior art that the present invention is directed. The instant invention addresses this unfulfilled need in the prior art by providing a system that converts a television, computer or other two-dimensional (2-D) screen system into a 3-D image and that removably attaches to an existing television, computer screen or other video monitor to convert a 2-D video projection to a 3-D video image as contemplated by the instant invention disclosed herein.

BRIEF SUMMARY OF THE INVENTION

In light of the foregoing, it is an object of the present invention to provide a video display system that displays a two dimensional (2-D) video image as a three dimensional (3-D) video image.

It is also an object of the instant invention to provide a 2-D to 3-D video display system that removably mounts to a television, computer monitor or other video monitor.

It is an additional object of the instant invention to provide a 2-D to 3-D video display system that converts a 2-D video image into a 3-D image without eyeglasses.

It is an additional object of the instant invention to provide a 2-D to 3-D video display system that magnifies a video image projected from a television, computer monitor or other video monitor.

It is a further object of the instant invention to provide a 2-D to 3-D conversion video display system that is adjustable.

It is yet another object of the instant invention to provide a 2-D to 3-D conversion video display system having a removable magnification screen.

It is yet a further object of the instant invention to provide a 2-D to 3-D conversion video display system that is cost effective for mass production and inexpensive for the average consumer.

It is yet an additional object of the instant invention to provide a 2-D to 3-D conversion video display system that is easy to install, use and adjust.

In light of these and other objects, the instant invention comprises a video image conversion system that takes a 2-D video projection from a television or computer screen and displays it as a 3-D image. The video display system of the instant invention comprises an auto-stereoscopic interference filter technology in a polarization system that creates 3-D viewing by creating the illusion of depth perception delivered from stereoscopic video images, i.e. 2-D, for a perception of 3-D depth. The 2-D to 3-D video image conversion display system comprises a housing compartment that stores and secures a 3-D polarization screen constructed from the same or similar polarization film used in 3-D eyeglasses. The polarization screen is preferably mounted to a spring-loaded rod inside the housing and is extendable from the housing and secured in a locked position in front of the television or video monitor and automatically retracts back into the housing when unlocked and released. In an alternative embodiment, the polarization screen may extended and refracted by a motor that mechanically communicates with the screen rod to make it rotate clockwise and counter clockwise. The instant invention also comprises a screen adjustment frame for adjusting the distance between the television screen or video monitor screen and the 3-D screen when it is extended. The video image conversion system also includes a magnification screen system that enlarges the projected 3-D video image and improves its clarity.

The video image conversion system in accordance with the instant invention is designed to enhance the viewing experience when watching television or a video or when playing video games by making the projection appear three dimensional, larger and clearer. The video image conversion system disclosed herein creates vivid in depth 3-D perception without the need for 3-D eyeglasses and is ideal for 3-D games, movies and other 2-D video projections.

In accordance with these and other objects, which will become apparent hereinafter, the instant invention will now be described with particular reference to the accompanying drawings.

DETAILED DESCRIPTION OF THE INVENTION

Figure 1:
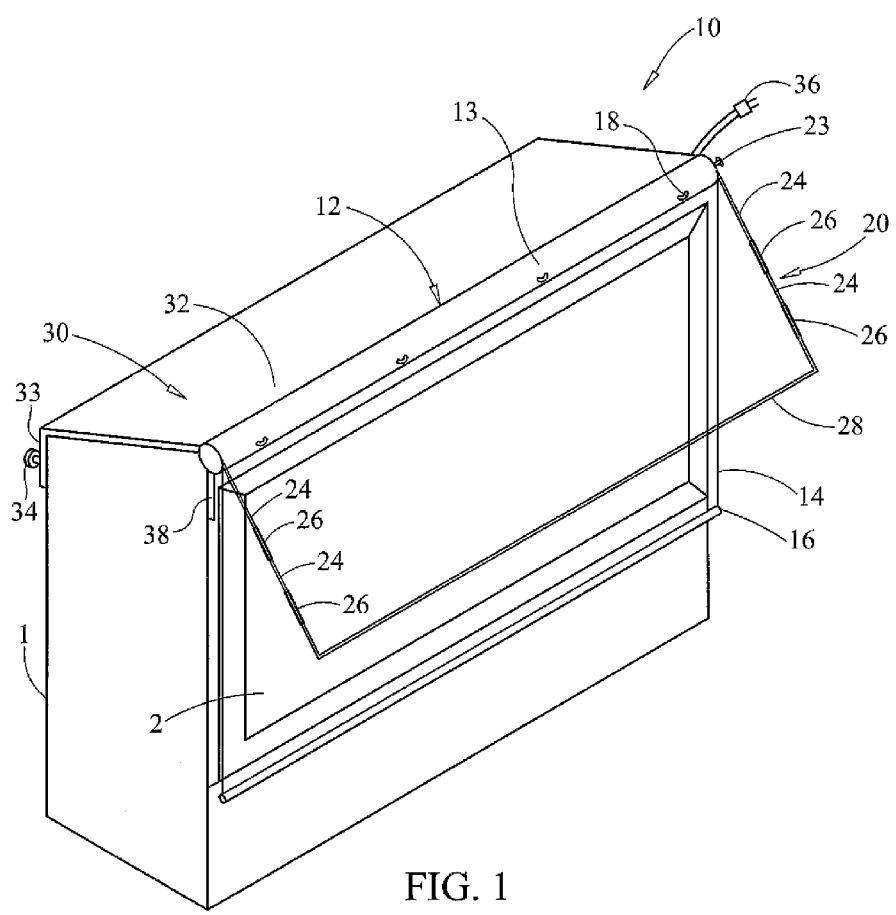
FIG. 1 is a perspective view of the 2-D to 3-D video image conversation system mounted to a television in accordance with the preferred embodiment of the instant invention.

With reference to the drawings, FIGS. 1 to 6 depict the preferred embodiment of the instant invention which is generally referenced as a video display system and, or by numeric character 10. The video display system 10 takes a 2-D video projection from a television 1 or computer screen and creates a 3-D image. The instant invention 10 comprises auto-stereoscopic interference filter technology in a polarization system 30 for creating 3-D viewing by enhancing the illusion of depth perception delivered from stereoscopic video images, i.e. 2-D, for a perception of 3-D depth. The video display system 10 also includes a magnification screen system 40 that enlarges the projected video and improves its clarity. The video display system 10 is designed to enhance the experience when watching television or a video or when playing video games by making the projection larger and clearer. The display system 10 creates vivid in depth 3-D perception without the need for 3-D eyeglasses and is ideal for 3-D games, movies and other 2-D video projections.

Figure 2:
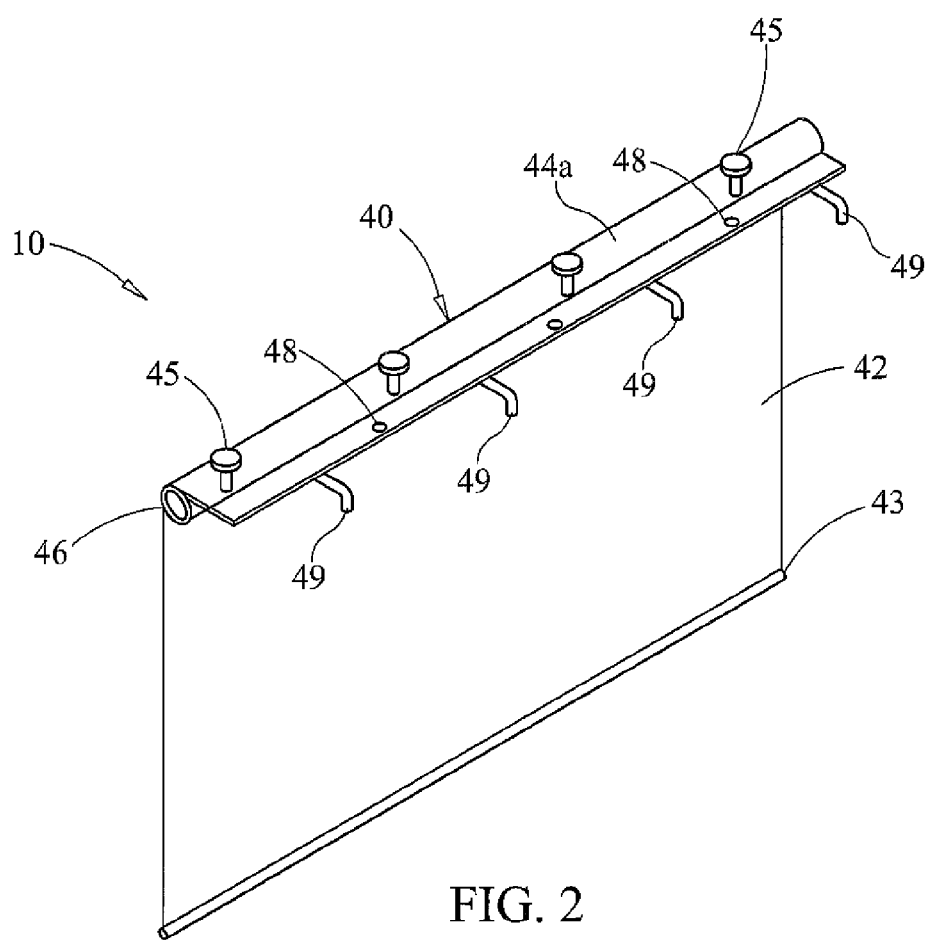
FIG. 2 is a perspective view of the microscopic video image enhancement system in accordance with the preferred embodiment of the instant invention.
Figure 3:
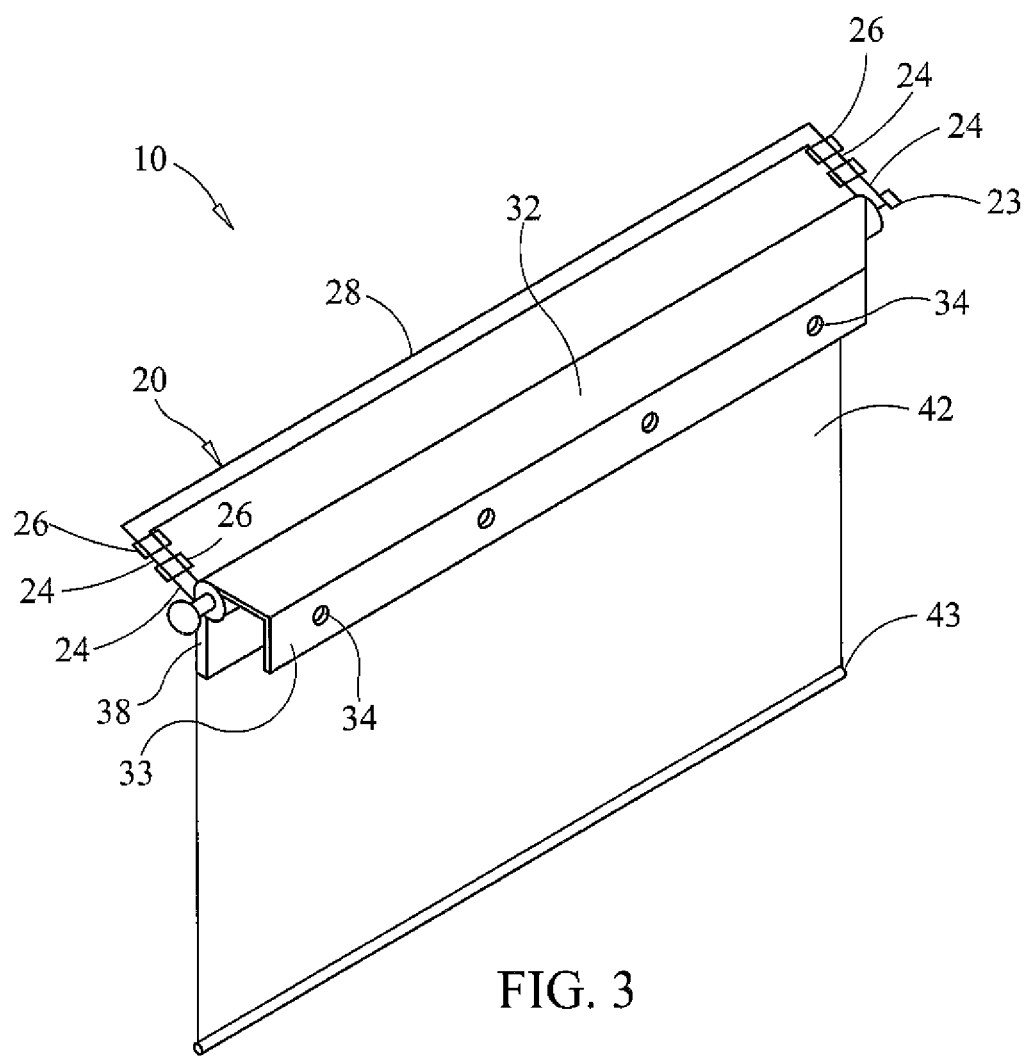
FIG. 3 is a perspective view of the 2-D to 3-D video image conversation system in accordance with the preferred embodiment of the instant invention.
Figure 4:
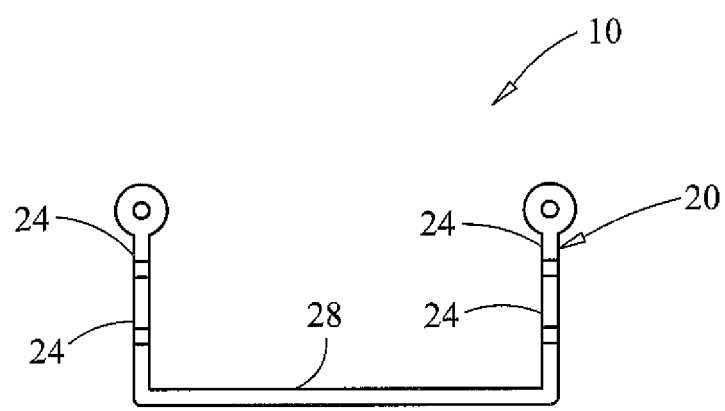
FIG. 4 is an elevational view of the 3-D active screen adjustable support arm of the 2-D to 3-D video image conversation system in accordance with the preferred embodiment of the instant invention.
Figure 5:
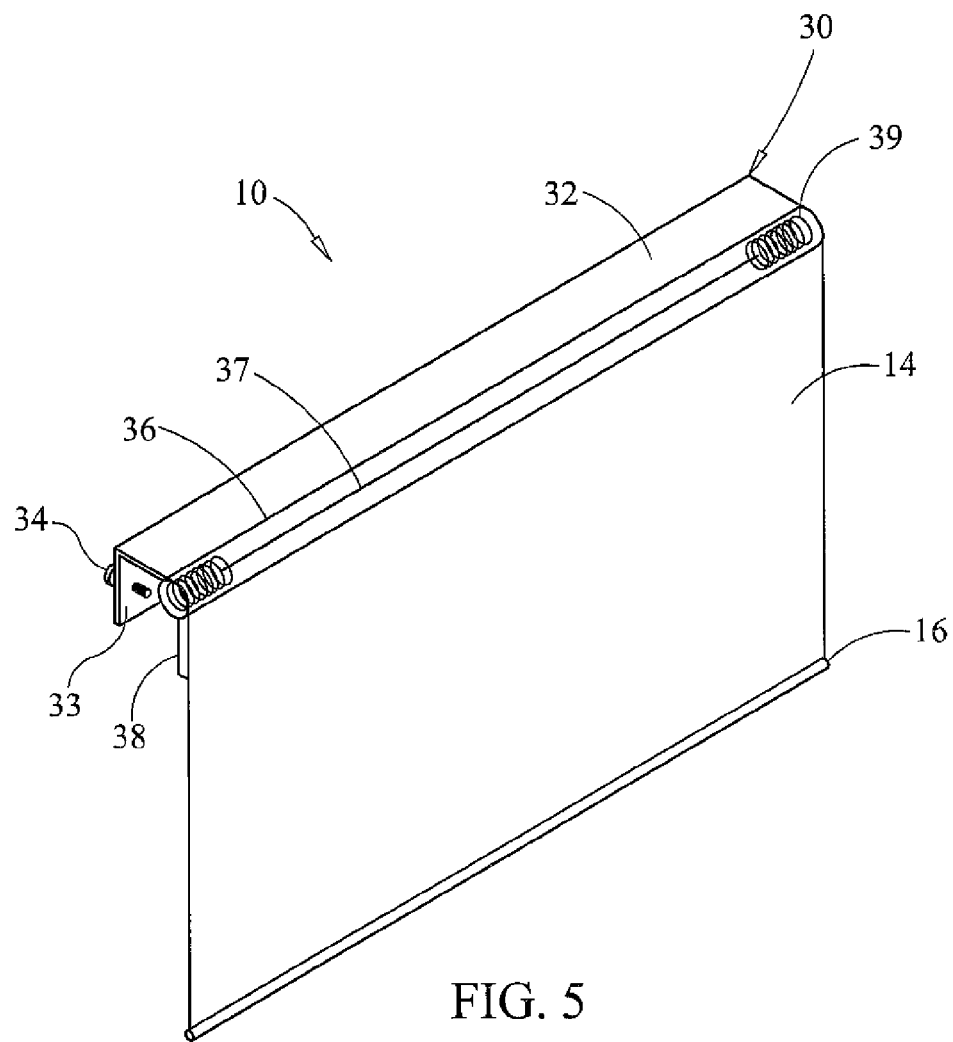
FIG. 5 is a partial cut-away view of the 2-D to 3-D video image conversation system illustrating the 3-D active screen retraction system in accordance with the preferred embodiment of the instant invention.

With reference to FIGS. 1-6, the video display system 10 preferably comprises a main housing 12, 3-D active video screen 14, 3-D video screen adjustable support arm system 20, 3-D video screen system 30 and microscopic/magnification vision screen system 40 supported by hooks 49 secured to the body 12. The video display system 10 may also comprise a crank for retracting and extending the video conversion screen 14 and a processor powered through a power cord to a DC or AC power source to enhance the 3-D affect. In the preferred embodiment of the instant invention 10, the main housing 12 comprises a rigid cylinder 13 that houses and supports a spring-loaded 3-D active video screen system 30. Referring to FIGS. 3-5, the 3-D video screen system 30 comprises a video screen support cylinder 36, an axle 37 and coiled springs 39 secured to proximal opposite ends of the axle 37 and the cylinder 36. The instant invention 10 may comprise only one coiled spring 39. The 3-D active video screen system 30 facilitates extending the screen 14 from the cylinder 36 into a fixed position and retracting the screen back into the cylinder 36 when not in use. The interior end of the 3-D video screen 14 is secured to the axle 37 inside the support cylinder 36. When the screen 14 is extended out from the cylinder 36, the axle 37 rotates causing the springs 39 to coil and store energy. The axle 37 is releasably locked in position with a key mechanism 50, like that used in house shades to maintain the screen 14 in a fixed, extended position during use. The video screen system 30 automatically retracts the screen 14 back into the cylinder 36 when the key mechanism 50 is unlocked wherein the stored energy in the springs 39 is released causing the axle 37 to rotate in the opposite direction. In an alternative embodiment, the axle 37 may be mechanically communicated with an electric motor 60 that replaces the springs 39 to impart rotational movement of the axle in either clockwise or counterclockwise directions when energized for extending and retracting the screen 14.

Still referring to FIGS. 3-5, the body 12 comprises a top support plate 32 having a depending back plate 33 and depending front plate 38 for gripping the top of a television 1 and tightening bolts 34 threadably and adjustably mounted to the back plate 33 for securing through tightening the body 32 of the video conversion system 10 to a television 1, computer screen or other video playing device, as shown in FIG. 1. The top support plate 32 may comprise two plates 32a and 32b that slide along opposing rods 32c and 32d for adjusting the width of the top support plate between the front plate 38 and back plate 33 for adjusting to the width of the television or video monitor. The 3-D video screen 14 is made from a material that enhances the 3-D depth perception, which preferably comprises black/red polarized film, blue ray or other suitable film of choice. The 3-D video screen 14 may comprise an electrically activated and controlled 3-D video screen for use with a microprocessor. The video screen 14 is removable for replacement with a new film or alternative film. The 3-D video screen 14 includes a video screen pull rod 16 secured in, to or by the screen 14 for actuating the screen 14. The magnification screen system 40 comprises a cylinder housing and support plate 41, magnification screen 42 that retracts into the cylinder when not in use, a video screen rod 43 secured in or by the free end of the magnification screen 42 and hooks 49 for mounting to the video screen support cylinder 36.

With reference to FIGS. 1 and 3-4, the 3-D video screen adjustable support arm system 20 is used for adjusting the angle of the 3-D video screen and distance from the television screen 2 (or computer screen as the case may be) when the 3-D video screen 14 is draped over it. The support arm system 20 preferably comprises retractable and adjustable side support arms 24, adjustable twist lock sleeves 26, U-shaped cross screen support arm 28 and tightening knob bolts 23 with knobs for gripping and rotating. The support arm system 20 may also have a horizontal adjustment component for adjusting the distance between the magnification screen 42 and television or monitor screen. The video screen support arm system 20 is rotatably, releasably and adjustably mounted to opposite ends of the body 12 by the tightening bolts 23. The support arm tightening bolts 23 also allows the video screen support arm system 20 to be removed from the body 12 when the bolts 23 are removed. The support arm 20 may be adjusted by a handle 18 attached to the support arm system 20. The side arms 24 telescopically mate with each other. The lower side arms 24 telescopically mate with the ends of the U-shaped cross support arm 28. The side arms 24 are locked in fully retracted, partially retracted or fully extended positions with respect to the lower side arms 24 by the upper adjustable twist lock sleeves 26. The U-shaped cross support arm 28 is locked in fully refracted, partially retracted or fully extended positions by the lower adjustable twist lock sleeves 26. The cross arm 28 may also be made by telescopic sections that allow the width of the support arm system 20 to be adjusted. The side arms 24 and U-shaped cross support arms 28 are prevented from being completed removed by flanges proximal the ends of the side arms 24 and cross arm 28.

Figure 6:
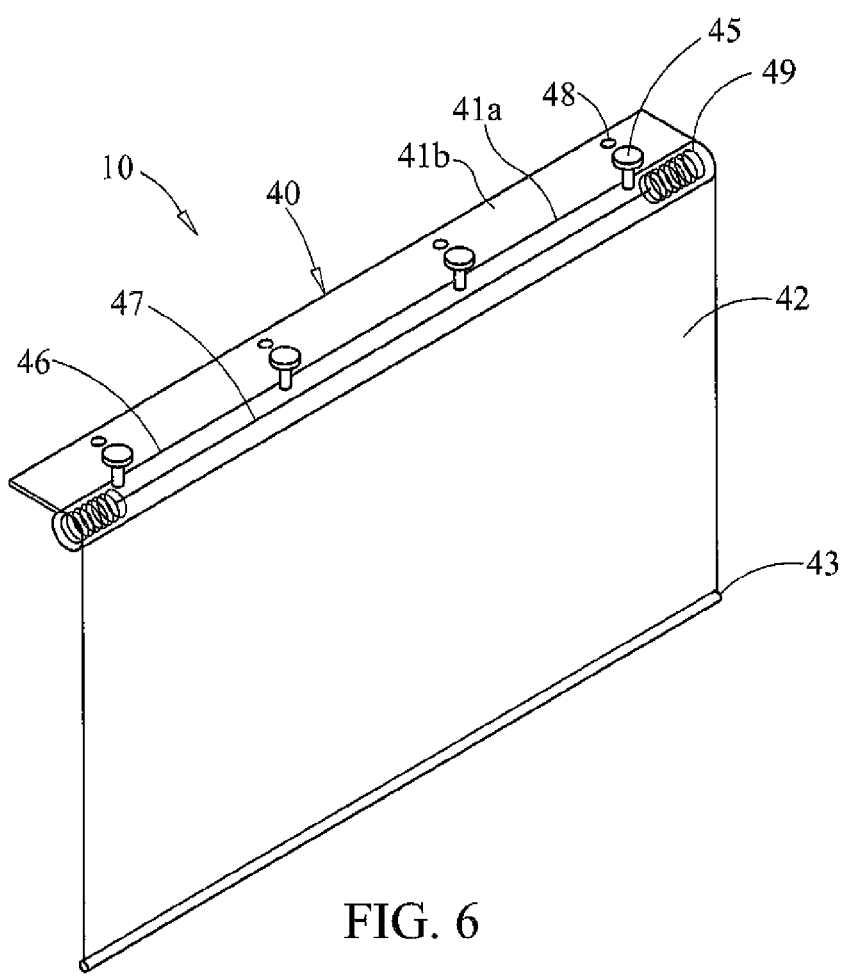
FIG. 6 is a partial cut-away view of the microscopic video image enhancement system of the 2-D to 3-D video image conversation system illustrating the microscopic active screen retraction system in accordance with the preferred embodiment of the instant invention.

With reference to FIGS. 2 and 6, the microscopic/magnification video vision screen system 40 comprises a body having a cylinder housing 41a, support plate 41b with mounting apertures 48 projecting out from the housing 41a, microscopic/magnification video vision screen 42 and a video vision screen refraction system 46, 47 and 49. The cylinder housing 41a stores and secures the video vision screen retraction system and at least a portion of the vision screen 42. The video vision screen retraction system comprises a video vision screen support shaft 46, axle 47 and coiled springs 49 secured over and proximal opposite ends of the axle 47. The vision screen system 40 may also comprise tightening knobs 45. The video vision screen retraction system 40 allows the vision screen 42 to be retracted into and extended from the cylinder housing 41a and held in any desired position. The axle 47 includes a releasable locking mechanism 51 for locking and releasing the action of the coiled springs 49 to allow fixing and moving the vision video screen 42 with respect to the cylinder housing 41a. The video vision screen 42 comprises a film that magnifies the image from the television/computer and 3-D video screen 12 to provide a larger video image with more clarity and possibly brighter colors to completely enhance the viewing experience. The vision video screen 42 also includes a vision screen pull rod 43 secured in, by or to the vision screen 42 for actuating the vision screen 42 with respect to the cylinder housing 41a. The mounting apertures 48 are sized and positioned for mating with the hooks 18 on the video conversion system body 12 for mounting the video vision screen system from the body 12 enabling the vision screen 42 to be pulled down in from of the 3-D video screen 12.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A two-dimensional (2-D) to three-dimensional (3-D) video display system that is mountable to a television or video display monitor having a video display screen for displaying a 2-D video projected from the video display screen as a 3-D video image, said system comprising:
   a 3-D video screen system comprising:
      a 3-D video screen housing;
      a 3-D video screen axle rotatably secured in said video screen housing;
      a 3-D video screen having a proximal end and distal end, said proximal end being secured to said axle, said 3-D video screen comprising a polarization film that converts a 2-D video projection to a 3-D video display; and
      a 3-D video screen axle rotation means, in mechanical communication with said axle, for rotating said axle in a first direction and a second direction for extending and retracting said 3-D video screen from said 3-D video screen housing;
   an adjustable video screen support arm system for adjusting the distance said 3-D video screen is from a video display screen; and
   support means, in mechanical communication with said 3-D housing, for mounting said 3-D housing to a television or video display monitor so said 3-D video screen is positioned in front of the video display screen when said 3-D video screen is in an extended position, said support means comprising a top support plate, a back support plate in mechanical communication with said top support plate and a front support plate in mechanical communication with an opposite side of said top support plate.

2. A system as recited in claim 1, further comprising:
   magnification means for magnifying the size of the 3-D video image displayed on said 3-D video screen.

3. A system as recited in claim 2, wherein said magnification means comprises:
   a magnification screen housing;
   a magnification screen axle rotatably secured in said magnification screen housing;
   a magnification screen having a proximal end and distal end, said proximal end being secured to said magnification screen axle, said magnification screen comprising a film that enlarges the appearance of the 3-D video display; and
   a magnification screen rotation means, in mechanical communication with said magnification axle, for rotating said axle in a first direction and a second direction for extending and retracting said magnification screen from said magnification screen housing.

4. A system as recited in claim 3, wherein said magnification screen axle rotation means comprises:
   at least one spring in mechanical communication with said magnification screen axle for storing energy when said axle is rotated in one direction; and
   a locking mechanism for locking said magnification screen axle in a desired position when said magnification screen is extended and for releasing said axle when said locking mechanism is released to retract said magnification screen into said magnification screen housing.

5. A system as recited in claim 3, wherein said magnification screen axle rotation means comprises an electric motor in mechanical communication with said magnification screen axle.

6. A system as recited in claim 4, wherein said 3-D video screen axle rotation means comprises:
   at least one spring in mechanical communication with said magnification screen axle for storing energy when said axle is rotated in one direction; and
   a locking mechanism for locking said 3-D video screen axle in a desired position when said 3-D video screen is extended and for releasing said axle when said locking mechanism is released to retract said 3-D video screen into said 3-D video screen housing.

7. A system as recited in claim 4, wherein said 3-D video screen axle rotation means comprises an electric motor in mechanical communication with said 3-D video screen axle.

8. A system as recited in claim 5, wherein said 3-D video screen axle rotation means comprises:
   at least one spring in mechanical communication with said magnification screen axle for storing energy when said axle is rotated in one direction; and
   a locking mechanism for locking said 3-D video screen axle in a desired position when said 3-D video screen is extended and for releasing said axle when said locking mechanism is released to retract said 3-D video screen into said 3-D video screen housing.

9. A system as recited in claim 5, wherein said 3-D video screen axle rotation means comprises an electric motor in mechanical communication with said 3-D video screen axle.

10. A system as recited in claim 1, wherein said 3-D video screen axle rotation means comprises:
    at least one spring in mechanical communication with said magnification screen axle for storing energy when said axle is rotated in one direction; and
    a locking mechanism for locking said 3-D video screen axle in a desired position when said 3-D video screen is extended and for releasing said axle when said locking mechanism is released to retract said 3-D video screen into said 3-D video screen housing.

11. A system as recited in claim 1, wherein said 3-D video screen axle rotation means comprises an electric motor in mechanical communication with said 3-D video screen axle.

12. A system as recited in claim 1, wherein said top support plate comprises:
    top support adjustment plate means for adjusting the width of said top support plate between said back support plate and said front support plate.

13. A system as recited in claim 12, wherein said top support plate adjustment means comprises:
    a first top support plate;
    a second top support plate;
    a first rod; and
    a second rod, said first top support plate and said second top support plate being slidably mounted to said first rod and said second rod.

14. A system as recited in claim 1, wherein said adjustable video screen support arm system comprises:
    a first adjustable side arm having a first locking means for holding said first adjustable side arm at a desired length;
    a second adjustable side arm having a second locking means for holding said second adjustable side arm at a desired length; and
    a U-shaped cross support arm in mechanical communication with said first adjustable side arm and said second adjustable side arm, said first adjustable side arm and said second adjustable side arm being in rotatable communication with said support means.

15. A system as recited in claim 1, wherein said 3-D video screen comprises:
a stereoscopic polarization film for creating the illusion of depth perception.

* * * * *